Dec. 13, 1960    J. L. ESTES    2,963,842
LAWN MOWER FOOT GUARD AND DEFLECTOR
Filed April 28, 1959
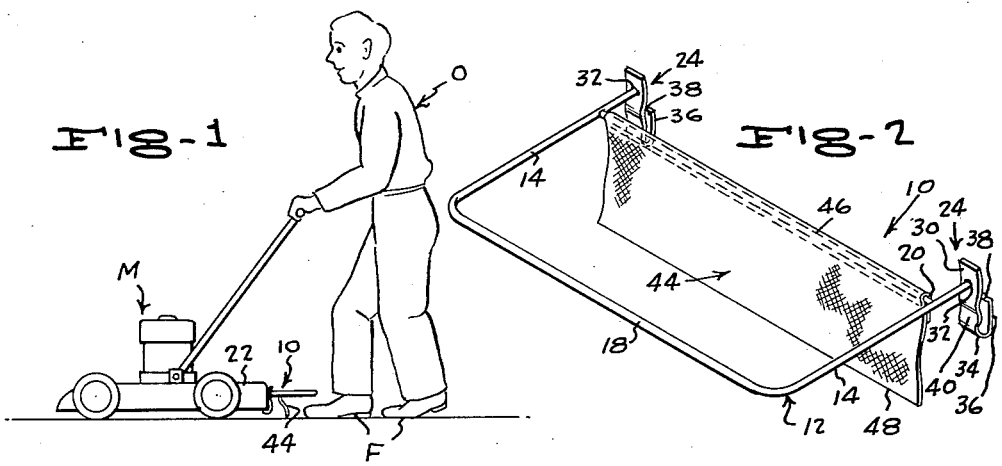
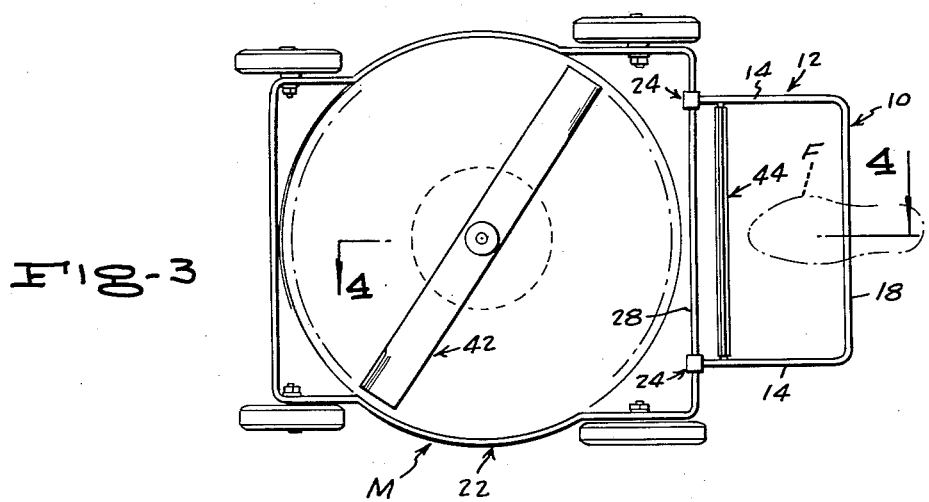
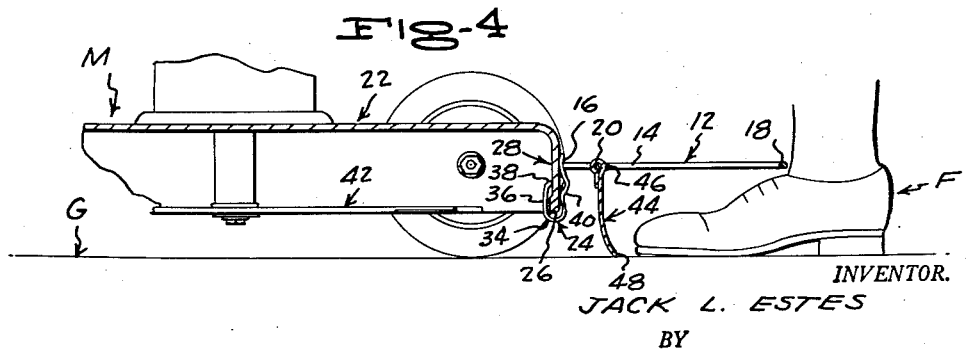
INVENTOR.
JACK L. ESTES 2,963,842
Patented Dec. 13, 1960

2,963,842

LAWN MOWER FOOT GUARD AND DEFLECTOR

Jack L. Estes, 2487 Bryant Circle, East Point, Ga.

Filed Apr. 28, 1959, Ser. No. 809,451

6 Claims. (Cl. 56—25.4)

This invention relates to a combined foot guard and deflector for lawn mowers.

The primary object of the invention is to provide a novel and efficient device of this kind which is attachable to extend rearwardly from a lawn mower and serves to prevent feet of the operator of the lawn mower from reaching so far forwardly, relative to the rear of the lawn mower, as to make injurious contact with the cutting blade assembly or rotor of the mower.

Another object of the invention is to provide a simple, inexpensive, and rugged device of the character indicated above which is quickly and easily attachable to and removable from a lawn mower, and which is easily adjustable to accommodate it to different lawn mowers, and to different desired heights above the ground.

A further object of the invention is the provision of a combined device of the character indicated above wherein the guard component serves as the support for a deflector of air, hard objects, and material thrown rearwardly by the operation of a lawn mower.

A still further object of the invention is the provision of a deflector which is flexible relative to its support, and can extend to near to or in contact with the ground, and which, because of its flexibility, can maintain its deflecting action while harmlessly yielding to unevenness in the ground traversed or anglings of a lawn mower as it is operated thereover, and when the mower is moved rearwardly.

Other important objects and advantageous features of the invention will be apparent from the following description and the accompanying drawings, wherein, for purposes of illustration only, a specific form of the invention is set forth in detail.

In the drawings:

Figure 1 is a schematic side elevation, showing a power lawn mower equipped with a device of the invention and positioned in protective relation to the feet of an operator of the lawn mower;

Figure 2 is an enlarged top perspective view showing a device of the invention;

Figure 3 is a bottom plan view, on an enlarged scale, of a power lawn mower, showing a device of the invention mounted on and extending rearwardly from its housing or casing; and Figure 4 is an enlarged fragmentary vertical longitudinal section taken on the line 4—4 of Figure 3, showing protective contact of an operator's foot with the device.

Referring in detail to the drawings, wherein like numerals designate like parts throughout the several views, the illustrated device, generally designated 10, comprises a U-shaped frame 12, of rigid but bendable material, such as metal rod, which has substantially parallel spaced longitudinal side members 14 having free forward ends 16, and rear ends which are fixed to or merged in related ends of a transverse bight portion rear cross member 18. The frame 12 further comprises a forward cross member 20 which is preferably parallel spaced from the rear member 18 and is suitably fixed at its ends to related side members 14, at points near to and spaced rearwardly from the free forward ends 16.

The frame 12, which is to have a generally horizontal and preferably parallel position relative to the ground G over which a lawn mower M is to be operated, has clamp mounting means secured on the forward ends 16 of the side members 14, which enable removable and supportable mounting of the device 10 on a lawn mower housing 22 to extend rearwardly therefrom. As illustrated in Figures 2 and 4, such mounting means can be in the form of bendable spring clips or clamps 24 to engage around the lower edge 26 of the rear end wall 28 of the housing 22.

Each of the clips 24 is U-shaped and comprises a vertical rear leg 30 which is suitably fixed, as by a welding 32 to the forward end 16 of a relative frame side member 14, so that the major part of the leg 30 extends below the frame 12. The clips further comprise a preferably arcuate bight portion 34, extending forwardly from the lower end of the rear leg 30 and merging into the lower end of a vertical and upstanding forward leg 36. The forward leg 36 is preferably shorter than the rear leg and is tensioned toward the rear leg 30, and has on its upper end a rearwardly extending gripping rib 38. The lower part of the rear leg 30 is indented to provide an arcuate forwardly extending gripping nose 40, opposed to the rib 38.

As shown in Figure 4, the clamps 24 are adapted to be forced upwardly around the lower edge 26 of the rear wall 28 of the mower housing 22, so as to spread apart the legs of the clamp and thereby put them under spring tension, and so that the nose 40 on the rear leg 30 bears frictionally against the rearward side, and the rib 38 bears frictionally against the forward side of the rear housing wall 28, in a manner to mount and secure the device in place thereon.

In order to accommodate the device 10 to lawn mower housings having differently shaped and/or differently angled rear housing walls, either or both the frame 12 and the clamps 24 can be bent, so as to have the frame 12 extend rearwardly therefrom at the desired angle to the ground G and preferably parallel thereto.

As indicated in Figure 4, the forward and rearward dimension or length of the frame 12 is longer than the lengths of the feet F of any expected operator O of a lawn mower equipped with a device of the invention, so that on movement of a foot F forwardly toward the lawn mower, the rear frame cross member 18 will be engaged by the foot or a portion of the ankle or leg thereabove, and thereby prevented from reaching under the housing 22 and making injurious contact with the cutter rotor 42. Thus, the device 10 serves to prevent injury to any part of a foot F through contact with the rotor 42 when a foot, ankle, or leg is forcibly engaged with the device, and also serves as a contact warning to the operator to keep his feet back out of harm's way.

The device 10 further comprises a deflector 44, which is mounted on and depends from the forward frame cross member 20, and serves to deflect or stop such as cut grass, stones, and earth, kicked up by the operation of the mower, from being thrown rearwardly against the feet of the operator. The deflector 44 also serves to prevent air and airborne debris from being blown rearwardly onto the feet of the operator, as would be particularly objectionable where the operator is working bare-foot or in open shoes.

The deflector 44 is a transversely elongated sheet or plate of flexible material, preferably such as heavy canvas or rubberized fabric, of a length to extend between the frame side members 14, and of a width to reach from the forward frame across member 20, at least to the ground G, and preferably somewhat wider, so that, as shown in Figure 4, the lower part of the deflector 44 bears upon and can maintain constant engagement with, and is slightly distorted or bent by its contact with the ground.

The deflector 44 is suitably mounted at its upper edge on and along the forward frame cross member 20, as by a sleeve 46 circumposed on the cross member and formed on the upper edge of the deflector and suitably closed around the cross member. The deflector 44 has a free horizontal lower edge 48, which is parallel to the frame 12.

As indicated in Figures 3 and 4, the forward frame cross member 20 is spaced rearwardly at a sufficient distance from the clamps 24, and hence the mower housing rear wall 28, and the cutting rotor 42, that the deflector 44, when in contact with the ground G and upon rearwardly operation of the mower M, cannot be drawn under the housing 22 and come into unwanted contact with the cutter rotor 42.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In a combination, a lawn mower having a cutter rotor housing having a rear wall, a horizontal open frame extending rearwardly from said wall, said frame having a forward end mounted on said rear wall and a rear end spaced rearwardly from said rear wall, said frame being spaced above the ground and said rear end of the frame serving as a foot stop, said frame having a cross member extending thereacross and spaced between said forward and rear ends, and a deflector suspended from said cross member.

2. In a combination, a lawn mower having a cutter rotor housing having a rear wall, a horizontal open frame extending rearwardly from said wall, said frame having a forward end mounted on said rear wall and a rear end spaced rearwardly from said rear wall, said frame being spaced above the ground and said rear end of the frame serving as a foot stop, said frame having a cross member extending thereacross and spaced between said forward and rear ends, and a deflector suspended from said cross member, said frame having clamp means on its forward end which are removably engaged around the rear housing wall.

3. A combined foot guard and deflector attachment for the cutter rotor housing of a lawn mower, said attachment comprising an open horizontal frame having a forward end and a rear end, a cross member on and extending across said frame and spaced from said forward and rear ends, a deflector suspended from said cross member, and means on the forward end of the frame for mounting the frame on a cutter rotor housing to extend rearwardly therefrom.

4. A combined foot guard and deflector attachment for the cutter rotor housing of a lawn mower, said attachment comprising an open horizontal frame having a forward end and a rear end, a cross member on and extending across said frame and spaced from said forward and rear ends, a deflector suspended from said cross member, and means on the forward end of the frame for mounting the frame on a cutter rotor housing to extend rearwardly therefrom, said deflector having a vertical width sufficient to cause flexing of and constant contact of the lower edge of the deflector with the ground.

5. A combined foot guard and deflector attachment for the cutter rotor housing of a lawn mower, said attachment comprising a horizontal U-shaped frame having a bight portion and legs extending forwardly from the bight portion, said legs having free forward ends, a cross bar extending between and secured to said legs at a point between and spaced from the forward ends of the legs and said bight portion, a deflector secured to and depending from said cross bar, and means on the forward ends of the legs for mounting the frame on a cutter rotor housing.

6. A combined foot guard and deflector attachment for the cutter rotor housing of a lawn mower, said attachment comprising a horizontal U-shaped frame having a bight portion and legs extending forwardly from the bight portion, said legs having free forward ends, a cross bar extending between and secured to said legs at a point between and spaced from the forward ends of the legs and said bight portion, a deflector secured to and depending from said cross bar, and means on the forward ends of the legs for mounting the frame on a cutter rotor housing, said deflector being flexible and having a ground engaging lower edge, and being of a vertical width to maintain said lower edge in contact with the ground.

References Cited in the file of this patent

UNITED STATES PATENTS

| | | |
|---|---|---|
| 2,489,059 | Surgi | Nov. 22, 1949 |
| 2,565,044 | Puls | Aug. 21, 1951 |
| 2,578,880 | Doyle | Dec. 18, 1951 |
| 2,659,191 | Miller et al. | Nov. 17, 1953 |
| 2,730,374 | Rogers et al. | Jan. 10, 1956 |
| 2,787,881 | McDaniel | Apr. 9, 1957 |